May 8, 1962 R. E. CALLIHAN 3,034,021
MAGNETIC TESTING SYSTEM
Filed May 4, 1959
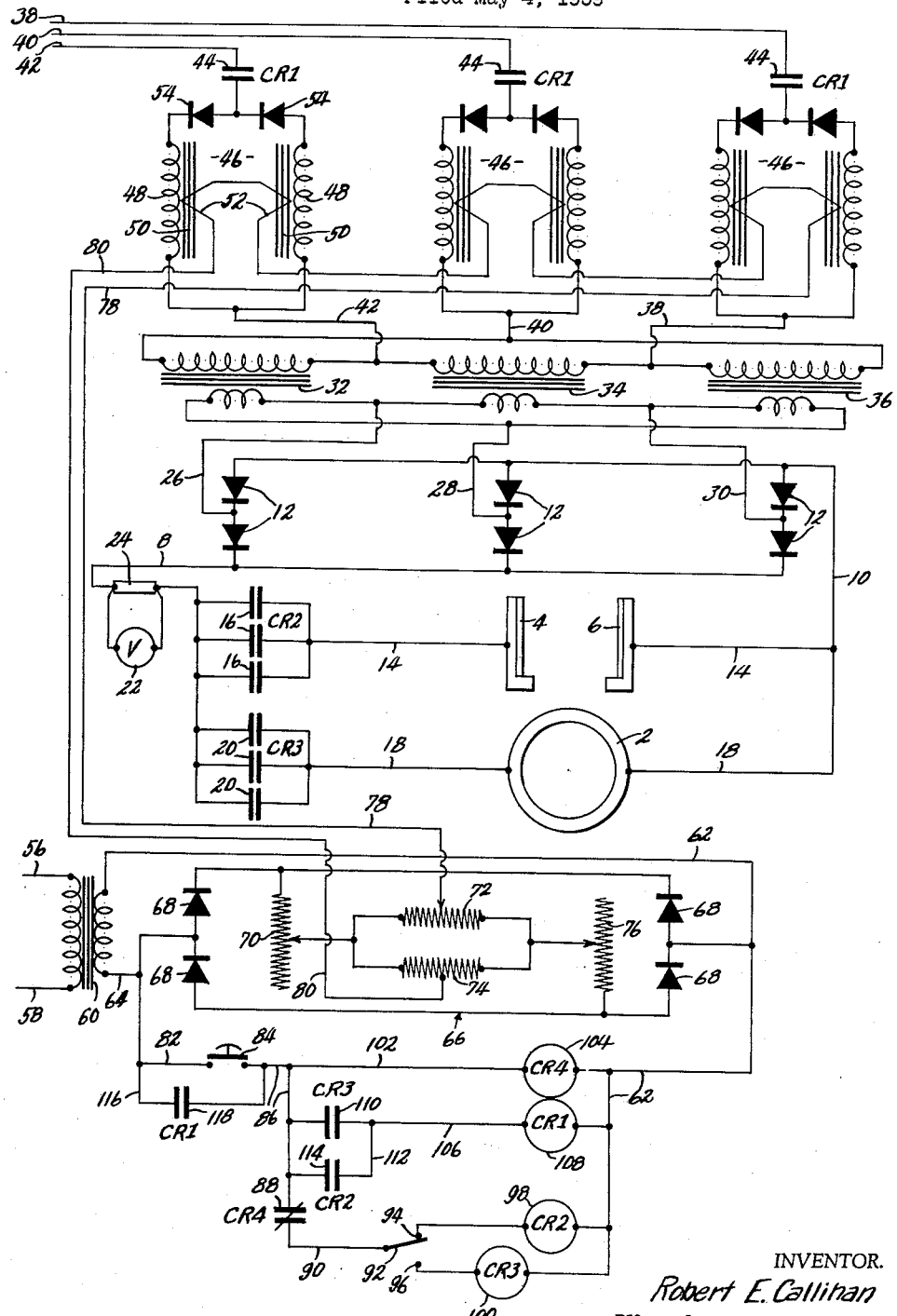
INVENTOR.
Robert E. Callihan
BY John A. Hamilton
Attorney.

3,034,021
MAGNETIC TESTING SYSTEM
Robert E. Callihan, Shawnee, Kans., assignor, by mesne assignments, to Automation Industries, Inc., Torrance, Calif., a corporation of California
Filed May 4, 1959, Ser. No. 810,778
8 Claims. (Cl. 317—123)

This invention relates to new and useful improvements in magnetic testing systems, and relates more particularly to a device and method for magnetizing a magnetizable metal part over which paramagnetic particles are to be distributed for the purpose of detecting surface or subsurface cracks or other defects therein.

One of the most common and commercially important methods of testing manufactured parts made of magnetizable metal for minute surface cracks or other flaws or defects is first to magnetize the part, and then to distribute paramagnetic particles over the surface thereof, either by dusting or by running over the part a liquid medium in which the paramagnetic particles are suspended. Any crack or other defect at or near the surface of the part will cause a leakage of magnetic flux at that point, with a consequent concentration of the particles at that point, thereby giving a visual indication of the presence and location of the defect. The paramagnetic particles may be distributed over the surface of the part while said part is disposed within a magnetic field, or after the part has been removed from the magnetizing field, in which case the residual magnetism remaining in the part is utilized to effect the distribution of the paramagnetic particles. These two systems constitute the two general methods commonly employed in tests of the kind under discussion. The present invention relates itself to a system and apparatus suitable for both types of tests.

The heavy current necessary for the magnetizing process is usually supplied by the rectified secondary output of a power transformer, the primary circuit of said transformer being supplied from a suitable source of alternating current, the rectified secondary circuit being passed either through a magnetizing coil, or supplied to a pair of heads between which the part to be tested is placed so as to form a leg of the circuit. Assuming that the part to be tested is elongated, and is placed axially in the magnetizing coil, current in the coil will magnetize the part so that the paramagnetic particles will detect cracks extending generally at right angles to the part axis, or "peripheral" cracks, while current passing longitudinally through the part between the heads will magnetize the part so that the paramagnetic particles will detect longitudinally extending cracks.

The magnitude of the current required depends on the size, configuration and other physical characteristics of the part to be tested, and therefore must be subject to close control for maximum efficiency of operation. In the past, this control has usually been effected by a voltage control device in the primary or secondary circuits, such as a variable resistance, auto-transformers in conjunction with tap changing switches, or by continuously tapped auto-transformers. All of these devices are mechanical devices with moving parts, and hence subject to mechanical wear and failure, and require frequent maintenance and replacement. Also, the large amount of current which must be handled makes the original cost of these components very high. Moreover, the tapped auto-transformer, which is in the most common use, will inherently provide voltage adjustments in discrete steps only, depending on the number of taps, not a continuous adjustment with an infinite number of settings. Since the magnetizing current flowing in the test part depends on the characteristics of the part itself as well as the tap setting, it is very difficult if not practically impossible to provide an auto-transformer with a sufficiently large number of taps to meet all requirements.

It is therefore a principal obect of the present invention to provide a magnetizing current control which will provide a substantially continuous adjustment with an infinite number of positions, and which has no moving parts in the portions thereof carrying the full operating current, and which therefore is not subject to mechanical wear and failures, and much more economical, Generally, this object is accomplished by inserting a saturable core reactor in the primary transformer circuit. A saturable core reactor is essentially a variable reactance coil which is varied by changing the amount of direct current flowing in a control winding, thereby varying the degree of saturation of the core of the device. The reactance and control windings of the device involve no moving parts, and the direct control current is quite small compared to the main power current and may be controlled by relatively light-weight and inexpensive equipment. A variable resistor in the direct current control circuit provides continuous adustment of the control voltage, and hence of the magnetizing current.

When magnetizing a part by means of a magnetic field established by an electric current, it is desirable that the current be built up slowly, since this avoids overheating of the part, as for example when a bulky part requiring a heavy current for magnetization is so shaped as to permit contact of very limited area with the heads of the machine.

It is therefore another object of the present invention to provide a system having a magnetizing current the establishment of which is characterized by a slow buildup. In the present device the slow build-up results inherently from the use of a saturable core reactor in the primary transformer circuit it being a well understood characteristic of such a reactor that its output builds up slowly when current is applied thereto, and also decays slowly when current thereto is interrupted.

It is desirable also that the magnetizing current be interrupted in a manner characterized by a very rapid break-down or decay. It is well known in the art that a rapid decay of the magnetizing current, and hence of the magnetic field, produces induced eddy currents in the test specimen which provide not only a much higher degree of residual magnetism in the test specimen, but also a better distribution of the flux in the specimen. In fact, a slow decay of the current usually results in actual demagnetization of the specimens, to a point where no worthwhile test can be conducted. In the present device, this rapid decay is accomplished by circuit breakers in the output of the rectifiers in the secondary transformer circuit which open while the full magnetizing current is flowing. The decay is thus rendered substantially instantaneous, rather than gradual, as would be the case if the power circuit were first broken in the primary transformer circuit.

Another object is the provision of a system of the character described wherein circuit breakers are provided in both the rectifier output circuit and in the primary transformer circuit, and wherein means are provided to close or open the rectifier output breakers and the primary transformer breakers in that order, whether the magnetizing current is being turned on or off. This sequential relationship provides, when the current is turned on, that the secondary circuit is closed before current is supplied to the saturable reactors, so that the secondary current will build-up slowly with the output of the reactors. When the current is turned off, the secondary breakers open first to cause a rapid decay of the secondary or magnetizing current independently of the primary circuit, which will decay only slowly when the primary circuit breakers are opened.

With these objects in view, as well as other objects which will appear in the course of the specification, reference will be had to the drawing, which is a circuit diagram of a preferred embodiment of the present invention.

In the drawing, the numeral 2 represents a magnetizing coil in which a part to be tested may be supported axially. When a heavy direct current is passed through the coil, as will presently be explained, it causes a longitudinal magnetization of the part, which must of course be paramagnetic in character, so that paramagnetic particles later distribtued over the surface thereof will concentrate about and thereby give visual indication of minute cracks or other surface or sub-surface defects in the part which extend generally transversely to the axis of the part. The numerals 4 and 6 indicate respectively a pair of heads between which a part to be tested may be placed to carry a heavy current applied between said heads. This causes magnetization of the part peripherally or transversely to its axis, so that paramagnetic particles later distributed over the surface of the part will detect cracks or other defects extending generally parallel to the axis of the part. It will of course be understood that in most instances a part must be magnetized by both the coil and the heads, in order that both types of defects may be detected.

Both the coil 2 and the heads 4 and 6 are connected in parallel relation across the output conductors 8 and 10 of a three-phase rectifier, all of the rectifier elements of which are indicated by the numeral 12. The leg 14 of the rectifier output circuit which contains heads 4 and 6 also contains the contacts 16 of a control relay designated CR2, and the leg 18 of the rectifier output circuit which contains coil 2 also contains the contacts 20 of a control relay designated CR3. The rectifier output circuit is also provided with a volt meter 22 which is connected across a standard shunt 24 and which may be calibrated in amperes and provides means for measuring directly the current flowing in the circuit. It will be apparent that the current will flow either to coil 2 or to heads 4 and 6, depending on whether contacts 16 or 20 are closed. CR2 and CR3 are of the multiple-contact type to supply the capacity for, and prevent damage by, the very heavy current to be carried thereby, said current often being on the order of several thousand amperes.

Three-phase rectifier 12 is supplied with alternating current through conductors 26, 28 and 30 from the secondary windings of three step-down power transformers 32, 34 and 36 connected in what is usually referred to as a delta circuit. The primary windings of said transformers are also delta-connected, and are supplied with current from the three wires 38, 40 and 42 of any suitable source of three-phase alternating current.

Interposed in each of wires 38, 40 and 42 are a pair of relay contacts 44, it being understood that all three of said sets of contacts are opened and closed simultaneously by a single coil, and together constitute a control relay designated as CR1. Interposed in each of wires 38, 40 and 42 between contacts 44 and the power transformer is a saturable core reactor designated generally by the numeral 46. Basically, a saturable core reactor as shown comprises a reactor coil 48, a core 50, and a direct current control winding 52. The magnitude of the direct current flowing in winding 52 varies the magnetic saturation of core 50, and controls the reactance or impedance of coil 48. Coil 48 thus acts as a throttle controlling the amount of power delivered to the power transformer, and thus the direct current eventually delivered to coil 2 or heads 4 and 6. It will be understood that the greater the direct current allowed to pass through control windings 52, the greater the output of the reactor will be. In the particular embodiment illustrated, each reactor comprises two reactor coils 48 connected in parallel, with a rectifier 54 in series with each coil so arranged that each coil conducts a uni-directional, half-wave current. This renders the coils "self-saturating," and provides a greater output with lighter, less bulky and less expensive equipment.

Control current for supplying direct current to control windings 52 of the reactors, and for other control operations to be described, is derived from a pair of line wires 56 and 58 which may be connected to a pair of wires 38, 40 and 42, or to any other suitable source of alternating current. Wires 56 and 58 energize the primary windings of a transformer 60. The secondary winding of said transformer is connected by wires 62 and 64 to a rectifier network 66 comprising four rectifiers 68 connected in the four legs of a diamond-shaped closed circuit, wires 62 and 64 being connected respectively to a pair of opposite angles of the diamond, and a bridge conductor being connected across the other pair of opposite angles of the diamond, the rectifiers being so arranged as to supply a uni-directional voltage to said bridge. Connected in series in said bridge is a variable resistor 70, a pair of resistors 72 and 74 connected in parallel with each other, and a variable resistor 76. A pair of wires 78 and 80 are connected respectively to a variable tap on resistor 72 and a fixed tap on resistor 74, and deliver direct current to control windings 52 of all of the reactors 46. When the variable tap of resistor 72 is moved in one direction relative to the fixed tap of resistor 74, a positive direct current will be applied to control windings 52, and when the variable tap is moved in the opposite direction relative to the fixed tap of resistor 74, a reversed or negative voltage will be applied to windings 52. The negative voltage is necessary when it is desired to obtain very low outputs from the reactors 46, in order to compensate for the inherent self-induction properties of coils 48 even when zero voltage is applied to the control windings. The variable resistors 70 and 76 permit adjustment to provide sensitivity of resistor 72 in the range of control voltages which may be required for any particular job.

In order to provide initiation and interruption of the magnetizing current, and in so doing to provide for the desired slow build-up and rapid decay thereof, there is provided a control circuit from output wire 64 of transformer 60 through wire 82, a push-button switch 84, wire 86, contacts 88 of a normally closed time-delay control relay CR4 which it will be understood will open a pre-determined time interval after current is applied to the coil thereof, and wire 90 to the movable contact 92 of a two-position selector switch having fixed contacts 94 and 96. Contact 94 is connected through the coil 98 of CR2 to the output wire 62 of transformer 60 to complete the circuit, and contact 96 is connected to wire 62 through the coil 100 of CR3. Connected between wires 86 and 62 is a conductor 102 which includes the coil 104 of CR4. Also connected between wires 86 and 82 is a conductor 106 in which is included in series the coil 108 of CR1 and a pair of interlock contacts 110 of CR3, it being understood that contacts 110 open and close simultaneously with contacts 20 of CR3 when current to coil 100 is turned off or on, Connected in a by-pass conductor 112 around contacts 110 is a pair of interlock contacts 114 of CR2. Connected in a by-pass conductor 116 around push-button switch 84 is a pair of interlock contacts 118 of CR1.

In operation, selector switch 92 is first set on contact 94 or 96, depending on whether it is desired to energize magnetizing coil 2 or the heads 4 and 6, say for the purposes of example, contact 94. A part to be tested, not shown, is supported between heads 4 and 6 so as to conduct current therebetween. Push-button 84 is then closed. This closes the circuit through the contacts 88 of CR4 and switch 92 to the coil 98 of CR2, which closes contacts 16 and interlock contacts 114 of CR2, and also energizes the coil 104 of CR4, so that contacts 88 will open after a pre-determined delay. However, heads 4 and 6 are not yet energized, since CR1 is still open. The closure of interlock contacts 114 establishes a circuit through conductor 106 to the coil 108 of CR1, causing contacts 44 of CR1 to close to supply current to reactors 46, whereby to supply current to heads 4 and 6 through transformers 32, 34 and 36, rectifiers 12 and contacts 16 of CR2. Also, energizing coil 108 closes the interlock contacts 118 of CR1, thereby holding the system in operation even when push-button 84 is released, so long as CR4 contacts 88 remain closed. It will be seen that since CR2 contacts 16 closed before reactors 46 were energized by the closure of CR1 contacts 44, and since the output of the reactors inherently builds up relatively slowly, the desired slow build-up of the magnetizing current is obtained. As previously explained, the slow build-up of the current between heads 4 and 6 avoids overheating of the test part between the heads. Also, the sequence of closing CR2 before CR1 provides that CR2 contacts are fully closed before the heavy magnetizing current, often on the order of several thousand amperes, is applied thereto. This avoids arcing and burning of said contacts, thereby increasing the life thereof and reducing maintenance costs. The magnitude of the magnetizing current may be adjusted by regulating variable resistor 72 to adjust the current flowing in control windings 52 of the reactors 46. This current is quite low as compared to the current in the reactor coils 48, and may be controlled with relatively light-weight, inexpensive equipment. The reactors themselves have no moving parts, and are thus substantially free from wear or breakage, and require no maintenance. The magnetizing current magnitude is read directly on the shunted voltmeter 22. The inherent slow build-up of output of reactors 46 is also advantageous with respect to this voltmeter, since it prevents overshooting of said meter and permits rapid and accurate reading. Otherwise relatively expensive meters with damping mechanisms or circuits would be required.

After the magnetizing current has flowed for a predetermined time, usually one second or less, as determined by the time delay built into CR4, contacts 88 of CR4 will open. This interrupts the circuit to coil 98 of CR2, permitting contacts 16 and interlock contacts 114 of CR2 to open. Opening of contacts 16 interrupts the magnetizing current to heads 4 and 6, and the opening of interlock contacts 114 interrupts the circuit to coil 108 of CR1, thereby opening CR1 contacts 44 and interlock contacts 118, and the system is at rest. It will be seen that since CR2 opened before CR1, the decay of the current between heads 4 and 6 is independent of the relatively slow output decay of reactors 46 when CR1 is opened, and will be virtually instantaneous. As previously explained, this rapid decay is very important in providing that an adequate degree of residual magnetism will remain in the test part, and in providing a better flux distribution in the part. The circuits involved in the energizing of coil 2 are activated by setting selector switch 92 on contact 96, and are sufficiently similar to those just described in connection with heads 4 and 6 that no detailed description thereof is believed necessary.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A magnetizing circuit comprising a transformer having a high voltage primary circuit arranged to be connected to a source of alternating current and a low voltage secondary circuit, a rectifier in said secondary circuit having an output circuit for supplying unidirectional current, means in said rectifier output circuit arranged to magnetize an object, an adjustable current throttling device in said primary transformer circuit, said current throttling device exhibiting a slow build-up of output when current is applied thereto, whereby to vary the current flowing in said rectifier output circuit, a first circuit breaker in said rectifier output circuit, a second circuit breaker in said primary transformer circuit, and a control circuit including means operable when energized to close said first and second circuit breakers in that sequence, whereby a slow build-up of current in said rectifier output circuit is obtained.

2. A magnetizing circuit comprising a transformer having a high voltage primary circuit arranged to be connected to a source of alternating current and a low voltage secondary circuit, a rectifier in said secondary circuit having an output circuit for supplying unidirectional current, means in said rectifier output circuit arranged to magnetize an object, an adjustable current throttling device in said primary transformer circuit whereby to vary the current flowing in said rectifier output circuit, said current throttling device exhibiting a slow decay of output when current thereto is interrupted, a first circuit breaker in said rectifier output circuit, a second circuit breaker in said primary transformer circuit, and a control circuit including means operable when said circuit is de-energized to open said first and second circuit breakers in that sequence, whereby a rapid decay of said rectifier output circuit is obtained.

3. A magnetizing circuit comprising a transformer having a high voltage primary circuit arranged to be connected to a source of alternating current and a low voltage secondary circuit, a rectifier in said secondary circuit having an output circuit for supplying unidirectional current, means in said rectifier output circuit arranged to magnetize an object, an adjustable current throttling device in said primary transformer circuit whereby to vary the current flowing in said rectifier output circuit, said current throttling device exhibiting a slow build-up of output when current is applied thereto, and a slow decay of output when current thereto is interrupted, a first circuit breaker in said rectifier output circuit, a second circuit breaker in said primary transformer circuit, and a control circuit including means operable when said control circuit is energized to close said first and second circuit breakers in that sequence, and when said control circuit is de-energized to open said circuit breakers in the same sequence.

4. A magnetizing circuit as recited in claim 3 wherein each of said circuit breakers includes normally open main contacts interrupting its associated power circuit and a coil operable when energized to close said contacts, and wherein said control circuit includes a pair of parallel branches in which the coils of said circuit breakers are respectively included, the circuit branch containing the coil of said second circuit breaker including in series with said coil a pair of interlock contacts operable to be closed by the energization of the coil of said first circuit breaker.

5. A magnetizing circuit comprising a transformer having a high voltage primary circuit arranged to be connected to a source of alternating current and a low voltage secondary circuit, utilization means coupled to said secondary circuit arranged to magnetize an object, an adjustable current throttling device in said primary transformer circuit exhibiting an inherently slow build-up of output when alternating current is applied thereto, thereby to vary the current flowing into said utilization means while avoiding overheating of the object, a first circuit breaker in circuit with said utilization means, a second circuit breaker in said primary circuit, and a control circuit including means operable when energized to close said first and said second circuit breakers in the just-named sequence whereby a slow build-up of current in said utilization means is obtained.

6. A magnetizing circuit comprising a transformer having a high voltage primary circuit arranged to be connected to a source of alternating current and a low voltage secondary circuit, utilization means coupled to said secondary circuit arranged to magnetize an object, an adjustable current throttling device in said primary transformer circuit exhibiting an inherently slow build-up of output when alternating current is applied thereto, thereby to vary the current flowing into said utilization means while avoiding overheating of the object, said adjustable current throttling device also exhibiting a slow decay of output when current thereto is interrupted, a first circuit breaker in circuit with said utilization means, a second circuit breaker in said primary circuit, and a control circuit including means operable when said control circuit is energized to close said first and said second circuit breakers in the just-named sequence and when said control circuit is deenergized to open said circuit breakers in the same sequence.

7. A magnetizing circuit comprising a transformer having a high voltage primary circuit arranged to be connected to a source of alternating current and a low voltage secondary circuit, utilization means coupled to said secondary circuit arranged to magnetize an object, an adjustable current throttling device in said primary transformer circuit exhibiting an inherently slow build-up of output when alternating current is applied thereto, thereby to vary the current flowing into said utilization means while avoiding overheating of the object, and by a slow decay when current thereto is interrupted, first and second circuit breakers each including normally-open contacts and a coil operable when energized to close said contacts, means for connecting said contacts of said first circuit breaker in circuit with said utilization means, means for connecting said contacts of said second circuit breaker in circuit with said primary circuit, a control circuit coupled to said coils of said circuit breakers, including a pair of interlock contacts in series circuit relation with said coil of said second circuit breaker adapted to be closed upon energization of said coil of said first circuit breaker, and including a time-delay relay having normally-closed contacts in series circuit relation with said coil of said first circuit breaker and having a coil connected in parallel relation with one of said coils of said first and said second circuit breakers.

8. A magnetizing circuit comprising a transformer having a high voltage primary circuit arranged to be connected to a source of alternating current and a low voltage secondary circuit, utilization means coupled to said secondary circuit arranged to magnetize an object, an adjustable current throttling device in said primary transformer circuit exhibiting an inherently slow build-up of output when alternating current is applied thereto, thereby to vary the current flowing into said utilization means, first switch means in circuit with said utilization means, second switch means for controlling said primary circuit, and a control circuit including means operable to actuate said first and said second switch means in the just-named sequence.

References Cited in the file of this patent
UNITED STATES PATENTS

| | | |
|---|---|---|
| 2,084,899 | Edwards | June 22, 1937 |
| 2,401,467 | Doane | June 4, 1946 |
| 2,871,417 | Connoy | Jan. 27, 1959 |

FOREIGN PATENTS

| | | |
|---|---|---|
| 419,110 | Great Britain | Nov. 6, 1934 |